July 8, 1941.  G. MEYER-JAGENBERG ET AL  2,248,534
METHOD OF MAKING PAPER CONTAINERS
Filed April 26, 1937   4 Sheets-Sheet 1

Inventors
Günther Meyer-Jagenberg
Adolf C. Plötze
By
Atty.

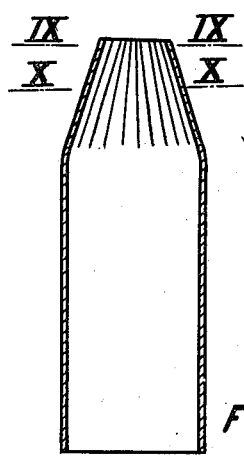
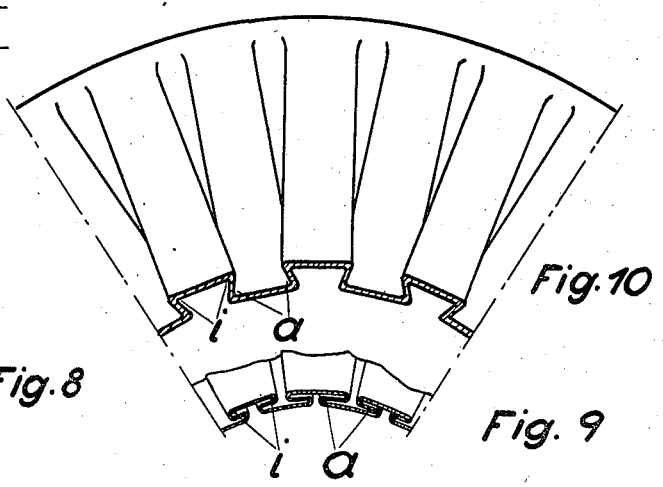
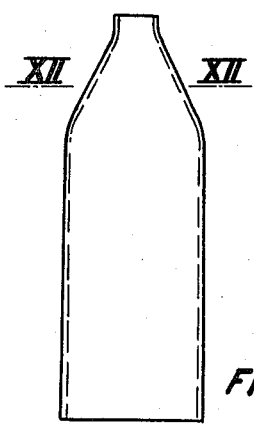
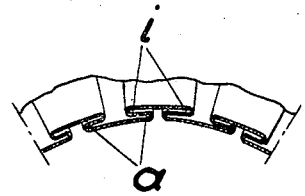
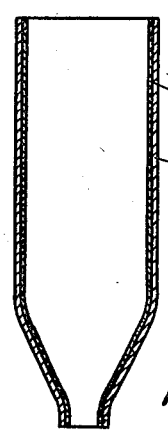
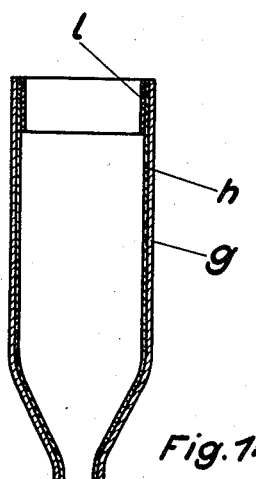

July 8, 1941.    G. MEYER-JAGENBERG ET AL    2,248,534
METHOD OF MAKING PAPER CONTAINERS
Filed April 26, 1937    4 Sheets-Sheet 4

Inventors
Gunther Meyer-Jagenberg
Adolf C. Plötze
by [signature] Atty.

Patented July 8, 1941

2,248,534

UNITED STATES PATENT OFFICE 2,248,534

METHOD OF MAKING PAPER CONTAINERS

Günther Meyer-Jagenberg, Dusseldorf, and Adolf Conrad Plötze, Berlin-Charlottenburg, Germany Application April 26, 1937, Serial No. 139,060

6 Claims. (Cl. 93—60)

The invention relates to a method of making paper containers, such as those used for oil.

There are already paper containers for oil known, the inner wall of which is coated with an oil-proof covering. In the paper containers known the oil-proof covering is, however, very brittle and consequently very sensitive against mechanical stress, for instance against knocks. The invention refers especially to the employment of an oil-proof covering for the inner wall of the paper containers which at the same time is rather pliable and consequently does not exfoliate when the container is exposed to knocks and the like. The invention relates further to such an improvement of the paper containers that the outer walls of the paper containers are likewise able to offer resistance against oil and water spots and the like. The invention relates furthermore to an oil-tight solid closure of the paper container.

It is known to manufacture such bottle-shaped tapered container from a tubular body in such a way that by folding and following pressing a contracted neck is formed. The method of producing such paper containers corresponding to the invention enables a uniform and clean formation of the folds especially when a high output is involved and consequently also achievement of a uniform, especially resistant body neck. The invention relates, furthermore, to an advantageous method of impregnating by which an economic employment of the impregnating means is obtained and by which it is also avoided that the impregnation is damaged by the other operations of the manufacturing process.

The method according to the invention enables furthermore a quick, safe, oil-tight closure of the paper containers filled with oil. It is especially avoided that the mouth of the paper container is overstrained when closing or that foreign parts—for instance some of the material serving for tightening of the closure—get into the oil contained in the paper container.

The tools and machines also corresponding to the invention serve for performing the method of invention and enable an economic high-speed production of the paper containers.

For demonstrating the invention, a few paper containers as well as the methods, the tools, and the machines serving for the manufacture of these paper containers are described in the following and illustrated in the figures.

The invention is, however, not limited to the embodiments described hereafter which only represent examples.

Fig. 8 shows a vertical section of a body the folding of which is compressed at the upper rim.

Figs. 9 and 10 illustrate—in an enlarged scale— a part each of the section according to the lines IX—IX and X—X respectively of Fig. 8.

Fig. 11 illustrates the finished shaped body.

Fig. 12 shows—in an enlarged scale—part of a section according to line XII—XII of Fig. 11.

Fig. 13 shows a section of a container body on the inside covered with a coating.

Fig. 14 shows a section of a container body covered with an inside coating and a ring of adhesive serving for fastening the bottom.

Figure 15:
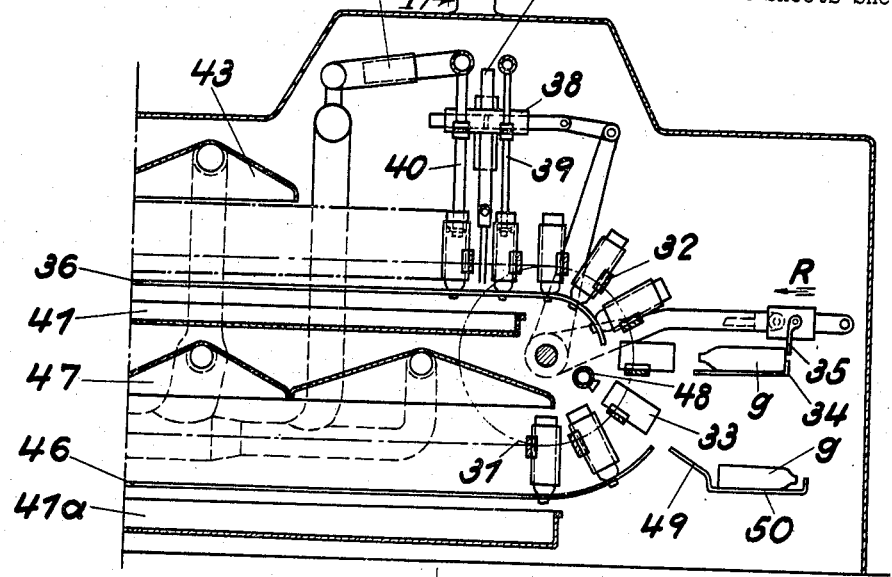
Figure 16:
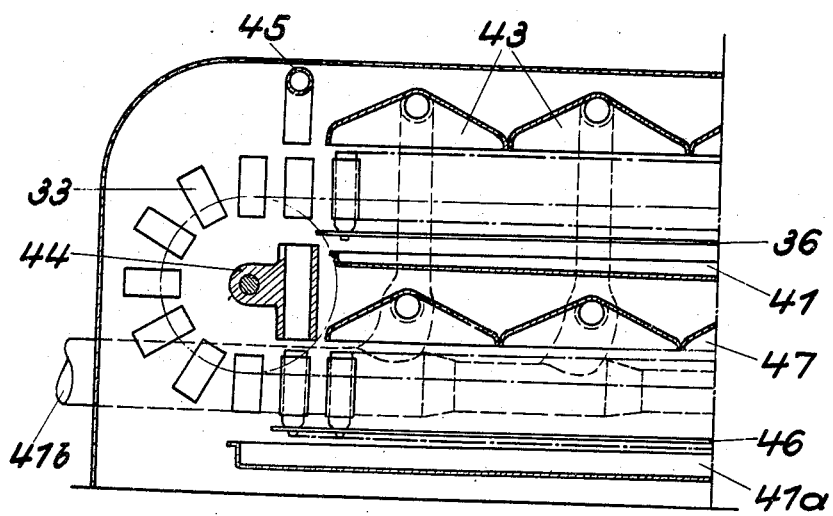

Figs. 15 and 16 together show a longitudinal section of a device for applying an impregnating coating on the inside of the container body.

Figure 17:
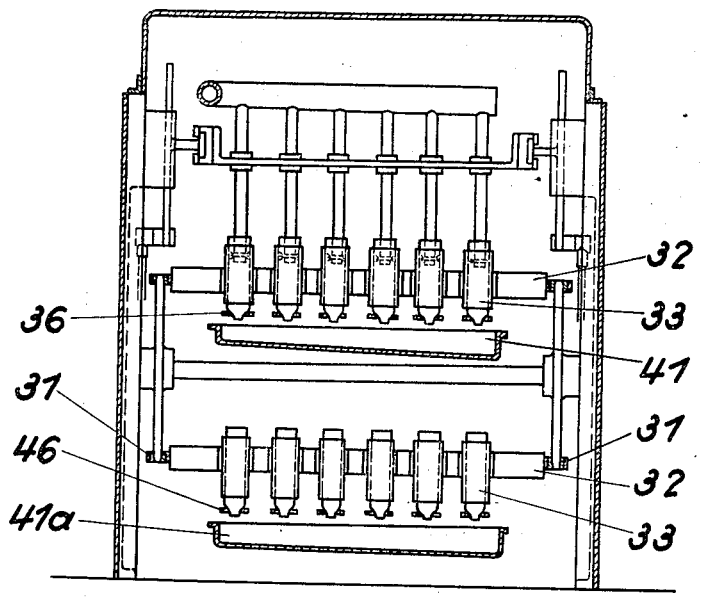

Fig. 17 shows a vertical section according to line 17—17 of Fig. 15.

The manufacture of tubular body

Figure 1:
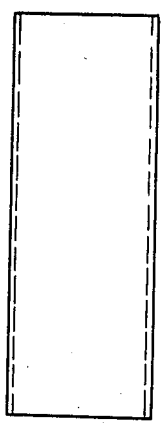
Figs. 1 and 2 illustrate a vertical elevation and a plan view of the tubular body of which the container body is made.
Figure 2:
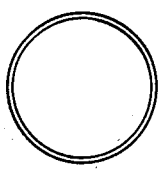

When manufacturing the paper container at first the tubular body, as shown in Figs. 1 and 2, is wound in a known manner and consists of several layers of paper being wound and glued. The outer layer consists preferably of a metallic paper or a foil-lined paper. The metallic face is placed on the outside and protects the paper container against damage by oil or water which easily may get on the outer face of the container. The metallic surface can easily be cleaned from oil and water, dust and dirt.

The preparation of the folding of neck

Figure 3:
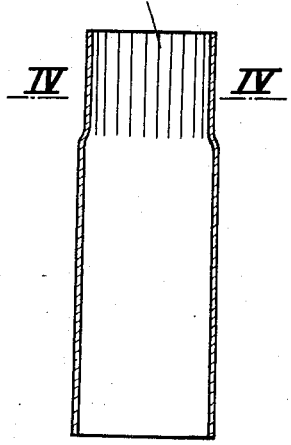
Fig. 3 shows a vertical section of a body prepared by applying crease lines.
Figure 4:
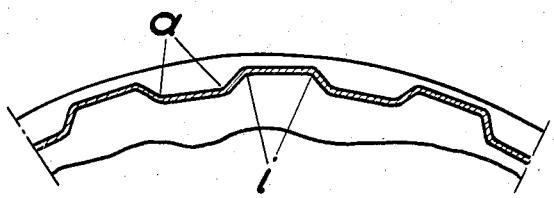
Fig. 4 shows—in an enlarged scale—parts of a section according to line IV—IV of Fig. 3.
Figure 5:
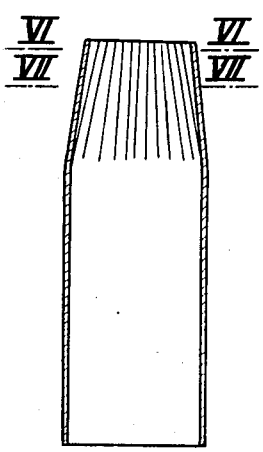
Fig. 5 shows a vertical section of the body the upper end of which is prepared by creasing prebending.
Figure 7:
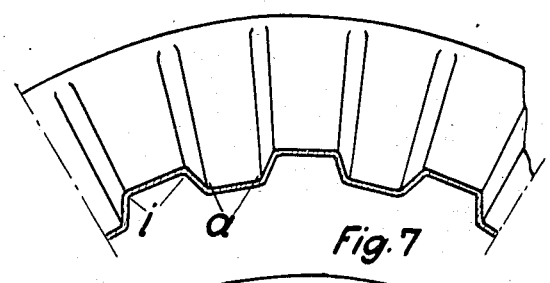
Figs. 6 and 7 show—in an enlarged scale—one part each of the section according to the lines VI—VI, VII—VII respectively of Fig. 5.
Figure 6:
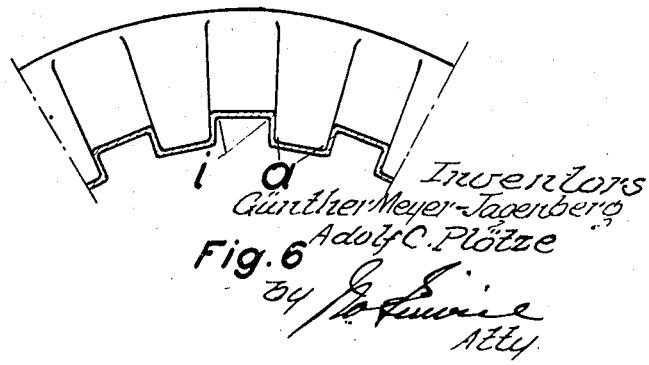

One end of the tubular body as shown in Figs. 1 and 2 and already known will be transformed into a bottle neck by preforming folds covering each other and by closing-in these folds. For preparing the folding according to the invention folding lines $a$ and $i$ are creased or scored in one end of the container, as shown in Figs. 3 and 4, prior to a substantial contraction or folding of the body end, i. e. prior to a substantial transformation. By this an exact position of the folding lines preparing the folding is guaranteed and a uniform closing-in is achieved. In the process hitherto known, in which however the end of the body is brought into a very tapered form without any previous preparation, irregular folding and closing-in may take place easily. When preparing a folding having a maeandriniform cross section in which—as shown in Fig. 12—the strips of folding lying on the outer face of the bottle neck overlap the adjacent inner strips of the bottle neck, according to further development of the invention, each two crease lines $a$, $a$ and $i$, $i$ are prepared in turn on the outer and the inner face of the body.

For performing this operation a mandrel is provided which penetrates one end of the body and which is provided with creasing rulers, the outer diameter of the mandrel differing only little from the inner diameter of the body, and further creasing rulers acting against the outer face of the body which engage the creasing rulers provided at the mandrel between the acting lines.

*The impregnating of the inner side of the paper container*

The inner face of the body being formed in accordance with Figs. 11 and 12 is covered with a protective coating before the bottom is inserted. The application of the protective coating onto the inner face of the container body prior to insertion of the bottom is advantageous, since the body of the container shows two openings in this state and the inside can easily be penetrated. Therefore the volatile constituents contained in the substance applied can easily evaporate; when applying a heated impregnating substance the coating can quickly be cooled down. Furthermore it is advantageous that the protective coating is applied after the forming of the container body as otherwise the protective coating might be damaged during the folding and pressing operations.

When applying the protective coating, the body of the container is preferably kept in such a way that the contracted mouth shows downwards, as demonstrated in Fig. 13. The substance serving for forming the protective coating is then sprinkled on to the inner face of the container body. The superfluous amount of the substance sprayed on then drips off through the bottle neck. In such paper containers which serve for the reception of oil or the like for the protective coating preferably polymerized derivatives of unsaturated organic hydrocarbons can be used, especially of the nature of acryl acid ester or vinyl ester—also for instance vinyl acetic acid ester. Such polymerized derivatives result in a coating not only being oil-proof but also very elastic and, therefore, being very resistable against mechanical stress of the paper container for instance against knocks.

Such means for impregnating can be applied as a solution. The solvents are very expensive and, therefore, it is recommendable to provide a plant for regaining the evaporated constituents of the solution. It is, however, to be preferred to emulsify the polymerized derivatives serving as means of impregnating with water. When employing emulsions of a watery nature the very expensive solvents as well as the plants for regaining may be spared. The conditions for the formation and employment of the emulsion are supported if small quantities of a solvent, for instance butanol which is not of a very volatile nature, are added.

For removing the evaporating solvents and the free particles of the acetic acid ester formation as well as the watery parts of the emulsion a blast of air is blown through the paper container, whereby a quick evaporation of the particles to be removed is caused.

In case an emulsion of a watery nature of high polymerized derivatives of unsaturated aliphatic hydrocarbons is employed for impregnating the inner walls of the paper container, it may happen that after evaporation of the watery parts of the emulsion the polymerized derivatives remaining on the inner face of the paper container cover the inner face all over, however, form many particles not completely combined with each other. In such cases it is advisable to moisten the inner face of the impregnated body after evaporation of the watery parts of the emulsion with alcohol or with another very volatile solvent, for instance to rinse the body of container with alcohol. By means of the solvent the single particles of the polymerized derivatives are slightly soluted on their surface so that they are welded to a certain degree during the following evaporation of the solvent.

For applying the protective coating on to the inner face of the container body serves the device as shown in Figures 15, 16 and 17. In this device conveyor chains 31 are guided over two pairs of sprockets one pair of which being slowly driven in any suitable manner. The chains 31 are combined with each other by rods 32 arranged transverse to their direction of movement. On the rods 32 pipe sections 33 are arranged which serve as carriers for the container bodies g that are to be coated with an inner protective coating. The chains 31 with the rods 32 fixed to them and the carriers 33 for the container bodies g are continuously travelling in the direction of the arrow P at slow speed.

The bodies g to be impregnated are fed in on a conveyor band 34 provided with receptacles and are pushed on to the carriers 33 by means of fingers 35 actuated to and fro by suitable known means, for instance by a crank gear. After the pushing-in movement has taken place in the direction of the arrow R, the fingers are lifted and are returned in lifted position so that they are not hindered during their return movement by the feeding in of further container bodies. After return, the fingers 35 are descended into the position shown in Fig. 15 and from this position they can push the next lot of bodies on to the carriers 33. The up and down tilting movement of the fingers is controlled by a cam or by other suitable means.

In order to avoid slipping of the bodies g off these carriers 33 as soon as these carriers are brought from their horizontal position into a vertical position two guiding rails 36 supporting the neck of the body have been provided on the track of each carrier 33.

A pusher 37 moved up and down by a well-known crank device in a vertical guide is provided with a slide 38 moveable in horizontal direction and driven by a cam. On this horizontally moving slide a sprinkle nozzle 39 and a nozzle 40 for blowing air are arranged for each row of travelling carriers 33. The pusher 37 and the slide 38 are operated in such a way that the sprinkle nozzles 39 and the nozzles 40 for blowing air are penetrating the container bodies moving downwards in these bodies and at the same time running along with them. After the mentioned nozzles 39 and 40 have nearly passed through the whole length of the container body they are quickly drawn upwards and guided back into the starting position—contrary to the forward movement of the container bodies g. Whilst the sprinkle nozzles 39 accompany the paper container and pass in it from head to foot the substance to be applied as protective coating is sprinkled around against the inner wall of the container body in a very thin plate-like spray so that this wall is completely covered. The superfluous amount runs off through the bottle neck and drips into the collection vessel 41. During the up and down movement a strong blast of air is blown vertically against the sprinkled inner wall by means of the nozzles 40 for blowing air, whereby the sprinkled coating is uniformly distributed. The compressed air for the nozzles 40 is supplied from the main pipe line 41b by means of the telescopic pipe 42 arranged tiltably on its ends.

During the further forward movement the container bodies provided with the inside coating are passed beneath the great stationary nozzles 43 which are also connected to the main air pipe 41b, so that remarkable quantities of air are blown through the container bodies.

As shown in the left-hand part of the Figure 16 the rails 36 supporting the neck of the container body terminate before the upper strands of the chains 32 arrive at the second pair of sprockets. On this spot a device for transferring is arranged which chiefly consists of a guide 44 and a blowing pipe 45. As soon as the bodies g contained in the carriers 33 have left the supporting rails 36 they pass beneath the blowing pipe 45 and are ejected off the carriers 33 by means of the blast of air, as they offer resistance to this blast of air owing to the contracted mouths of their necks. The container bodies g slide through the guide 44 the inner diameter of which is slightly wider than the outer diameter of the container body into the carriers 33 of the lower strands of the chains 31 beneath the guide 44. The carriers 33 of the lower strands of the chains 31 are provided with the rails 46. Above the way of the carriers 33 which are fastened to the lower strands of the chains further devices 47 for blowing are provided; beneath this way a further collection vessel 41a is provided for the substance that might still drip off the container bodies. By this arrangement the upper and the lower strands of the conveyor chains 31 being provided with carriers 33 are made to serve the operation of coating and airing the container bodies. It is advantageous that hereby the direction of the axis of the container body is not altered. If it should happen that on one spot a superabundant coating took place, the superfluous amount flows off in one direction; this flowing off is not disturbed by the fact that the container is turned over when the carrier 33 rotates round the second sprocket. After passing the lower strand of the chains the bodies g leave the lower supporting rails 46 and are then ejected from the carriers 33 by a blowing pipe 48 and pass over an inclined chute 49 to a conveyor band 50 driven in a suitable manner.

It is, furthermore, recommendable to control each single sprinkle nozzle 39 by a special feeler in such a way that the sprinkling of the coating substance is interrupted during the downward movement of the sprinkle nozzle 39 in case there is no container body in the carrier 33 corresponding to the respective sprinkle nozzle. The means for executing such feelers and control devices are known so that here further particulars with regard to the construction may be set aside.

The dripping off of the superfluous amount of the protective coating can be supported in such a way that especially in the upper strands of the chains 31 a shaking movement is applied; for the creation of this shaking movement a small knocking device or an irregularly shaped rotating cam acting on the upper strands of the two chains could be used for instance.

In such cases where an emulsion of highly polymerized derivatives of aliphatic hydrocarbons has been sprinkled on to the inner walls of the container body by means of the device shown in Figs. 15, 16 and 17 and where after the evaporation of the watery particles of the emulsion the polymerized derivatives that have set on the inner wall of the body do not form particles completely united with each other, the container bodies pass once more the corresponding devices shown in Figs. 15, 16 and 17. By means of the sprinkle nozzles 39 alcohol or another solvent is sprayed on the impregnated inner wall. By blowing the air through by means of the blowing nozzles 40, 43, 47 the alcohol or other solvent evaporates again, whereby the particles of polymerized derivatives, soluting on their surface by means of the alcohol or other solvent, are welded together. The vapour caused by this and containing the evaporated alcohol is sucked off of the device and can be led to the known regaining plant.

What we claim is:

1. Method for producing bottle-like shaped paper containers the innermost edge of which is coated with an impregnating substance comprising polymerized derivatives of unsaturated aliphatic hydrocarbons emulsified in water or similar non-solvents, said method comprising such a succession of operations that firstly a conical neck is formed by folding and compressing the upper end of a tubular body, that then the said impregnating substance is applied to the innermost side, and that finally the bottom is inserted into the body.

2. A step in the process of manufacturing paper containers by performing the method corresponding to claim 1, said step consisting in spraying the impregnating substance on the innermost side of the body and in blowing pressed air violently against the coated side whilst the coating is not yet stiffened.

3. A step in the process of manufacturing paper containers by performing the method corresponding to claim 1, said step consisting in blowing a blast of air or other gas through the body of the container after having coated the innermost side and before inserting the bottom.

4. A step in the process of manufacturing paper containers by performing the method corresponding to claim 1, said step consisting in coating the innermost side of the bottom with an impregnating film or layer prior to inserting the bottom into the body of the container.

5. Method for producing oil-tight paper containers comprising the coating of the innermost side with polymerized derivatives of unsaturated aliphatic hydrocarbons, such as acryl acid ester or vinyl ester, emulsified in water or similar non-solvents.

6. Method according to claim 5, comprising the coating of the innermost side with polymerized derivatives of unsaturated aliphatic hydrocarbons, such as acryl acid ester or vinyl ester, emulsified in non-solvents, the dried coating of the innermost side of the body of the container being subsequently moistened with alcohol or another solvent.

GÜNTHER MEYER-JAGENBERG.
ADOLF CONRAD PLÖTZE.